April 25, 1939.  M. G. BOERGER  2,156,049
CUT-OFF MACHINE
Filed Sept. 25, 1937   5 Sheets—Sheet 1
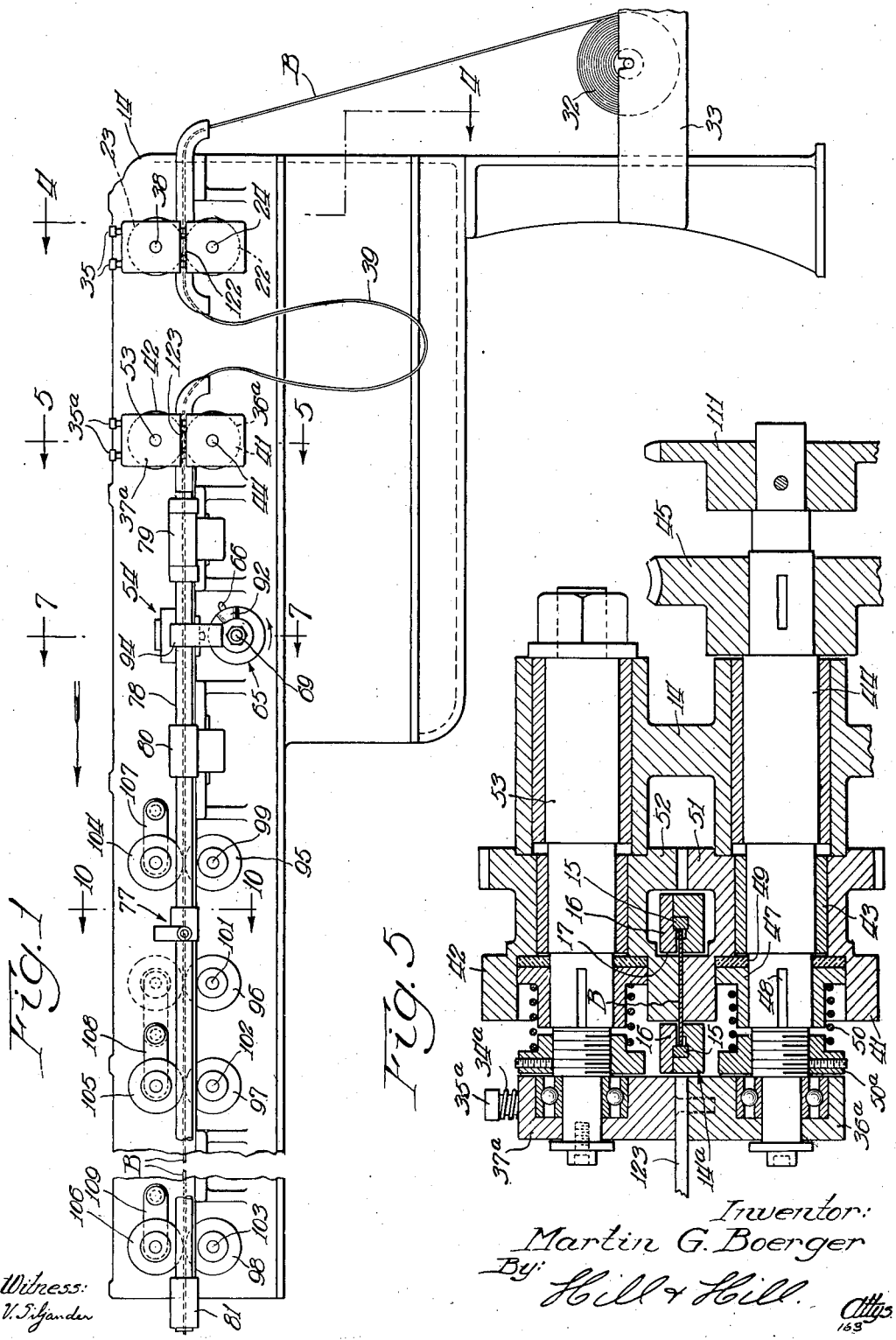
Inventor:
Martin G. Boerger
By: Hill & Hill
Attys.

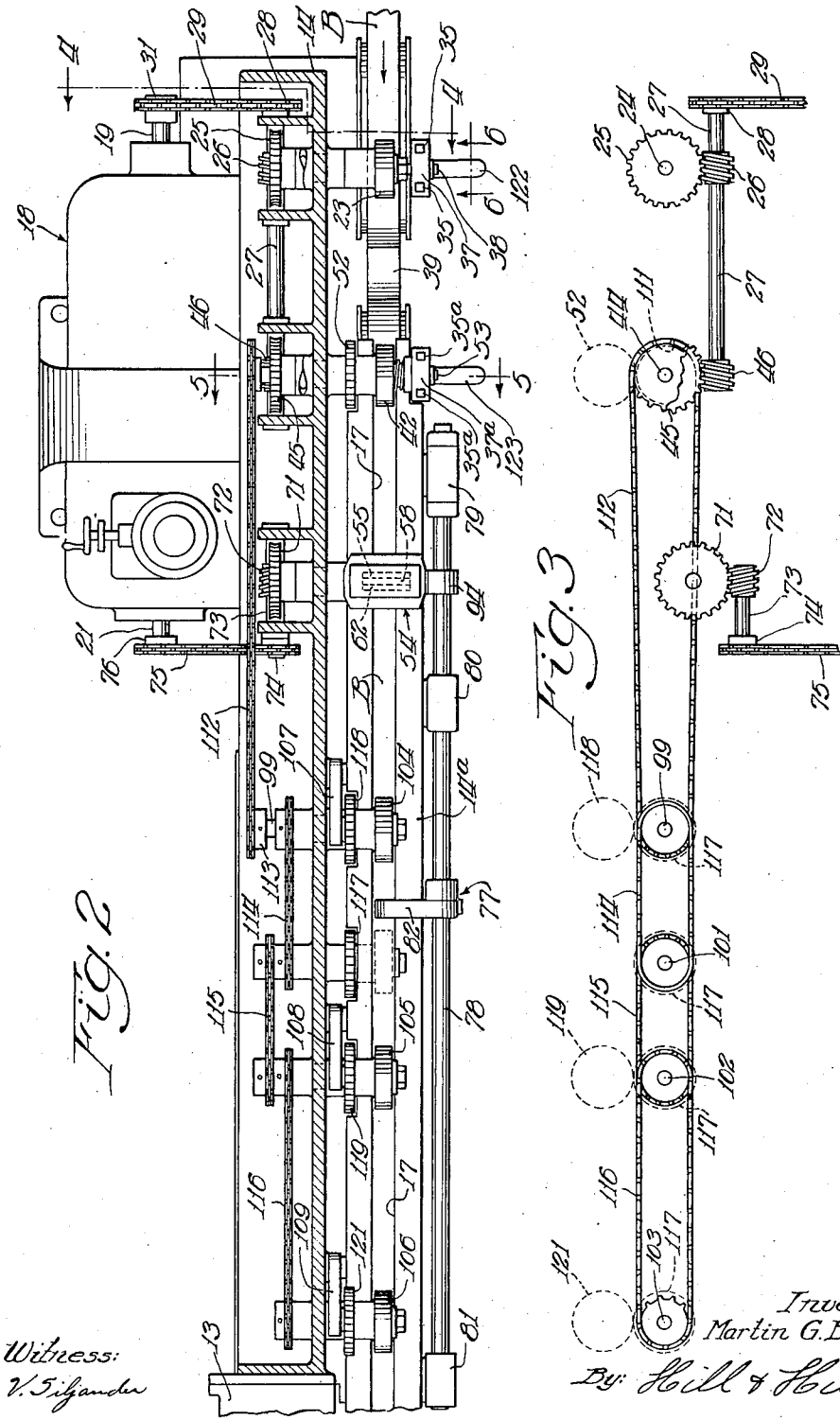

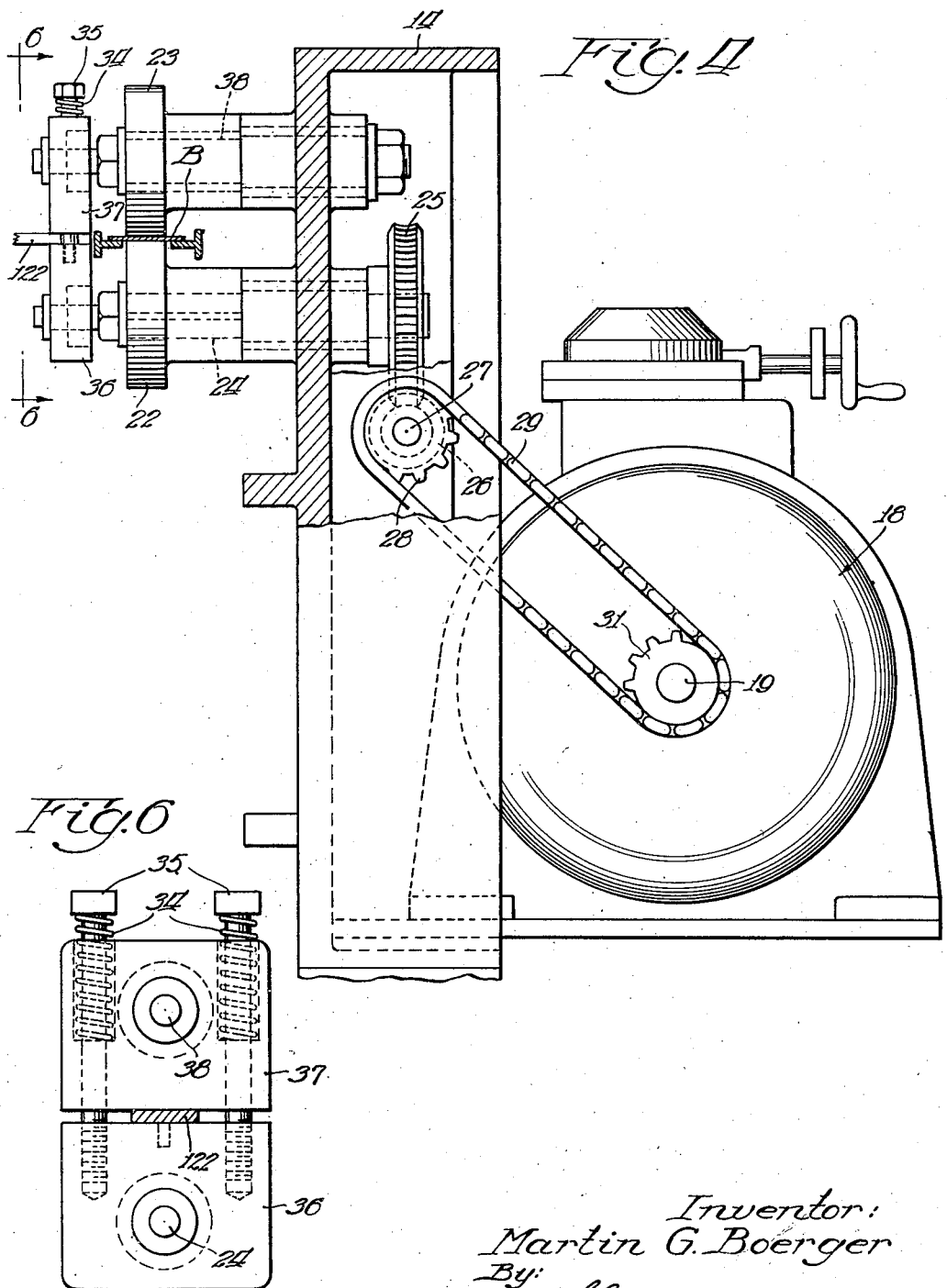

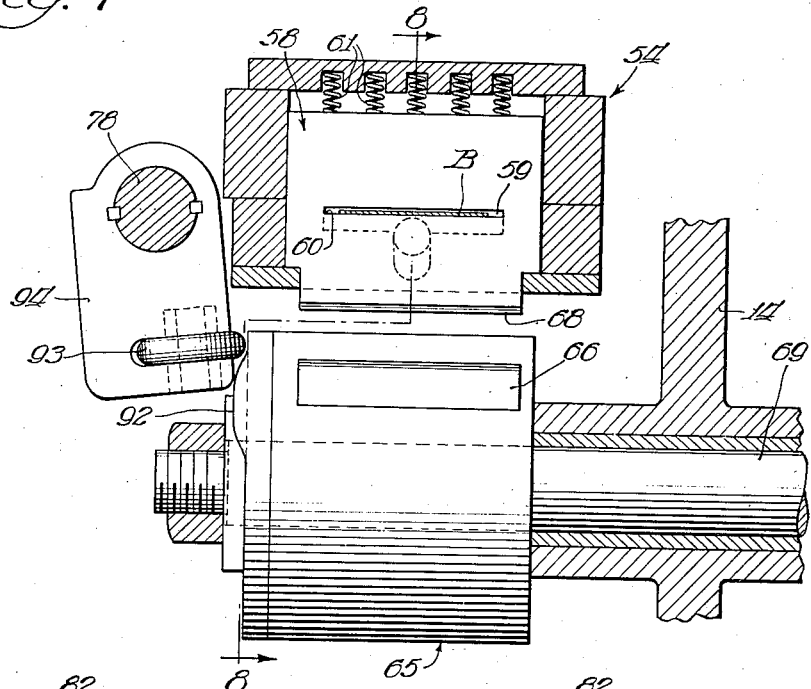
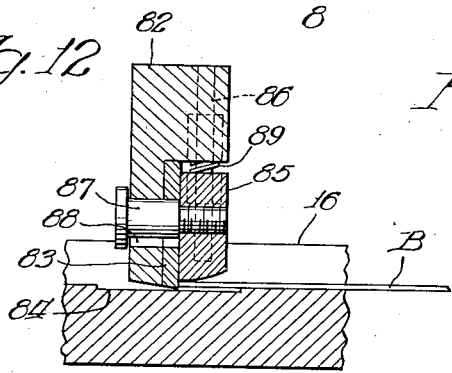
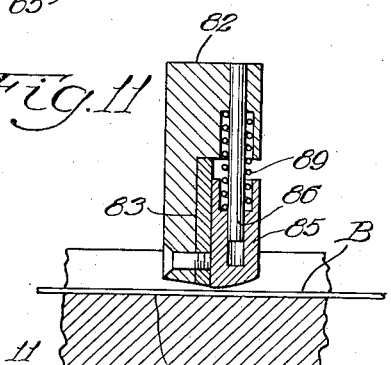
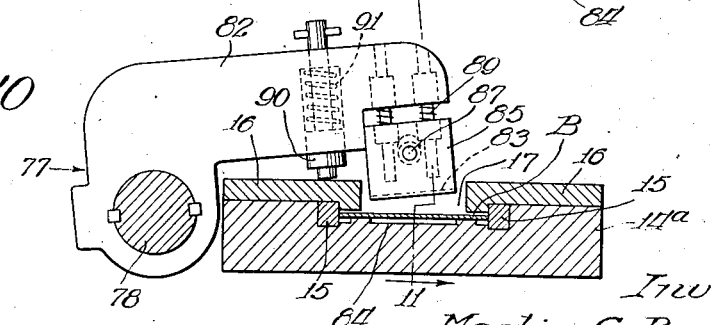

April 25, 1939.          M. G. BOERGER          2,156,049
CUT-OFF MACHINE
Filed Sept. 25, 1937          5 Sheets-Sheet 5

Witness:
V. Silgander

Inventor:
Martin G. Boerger
By:
Hill & Hill
Attys

Patented Apr. 25, 1939

2,156,049

UNITED STATES PATENT OFFICE 2,156,049

CUT-OFF MACHINE

Martin G. Boerger, Racine, Wis., assignor to Modine Manufacturing Company, Racine, Wis., a corporation of Wisconsin Application September 25, 1937, Serial No. 165,627

11 Claims. (Cl. 164—49)

This invention relates to material feeding and cutting machines, and particularly to a cut-off machine having novel mechanism for feeding a strip of tube stock, for example, to a gauge or stop member and cutting device for cutting the strip into suitable or desired lengths, and delivering the cut-off portions to a tube forming machine.

One object of the present invention is to provide a machine having mechanism of novel construction and arrangement whereby a strip of tube stock may be fed continuously to the machine and be intermittently cut off into desired lengths.

Another object of the invention is to provide novel feeding means for the strip which will permit of arresting the movement of the strip during the operation of the gauging and cutting devices.

Another object of the invention is to provide novel actuating means for the gauge or stop member and the cutting device whereby the operations of the stop member and cutting device are maintained substantially in synchronism.

Another object of the invention is to provide novel means whereby the strip may be cut into various lengths as desired.

A further object of the invention is to provide a machine wherein the speed of the feed and delivery rolls may be varied with respect to the operation of the stop and cut-off device.

A still further object of the invention is to improve machines of the character described in sundry details hereinafter referred to and particularly pointed out in the appended claims.

One embodiment of the present invention is shown for illustrative purposes in the accompanying drawings, in which:

Fig. 1 is a side elevational view of a cut-off machine embodying features of the present invention;

Fig. 2 is a plan view, partly in section, of the structure illustrated in Fig. 1;

Fig. 3 is a diagrammatical view of a portion of the driving mechanism employed in the operation of the machine;

Fig. 4 is an enlarged vertical sectional elevational view of a portion of the feeding mechanism and driving means associated therewith, the view being taken substantially as indicated by the lines 4—4 of Figs. 1 and 2;

Fig. 5 is an enlarged sectional elevational view of additional driving mechanism, taken substantially as indicated by the lines 5—5 of Figs. 1 and 2;

Figure 8:
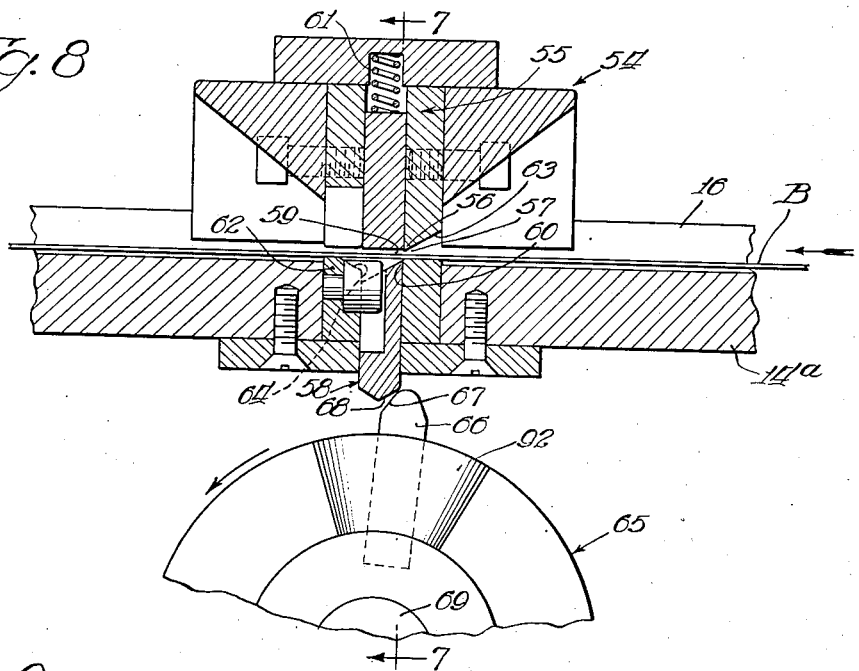
Figure 9:
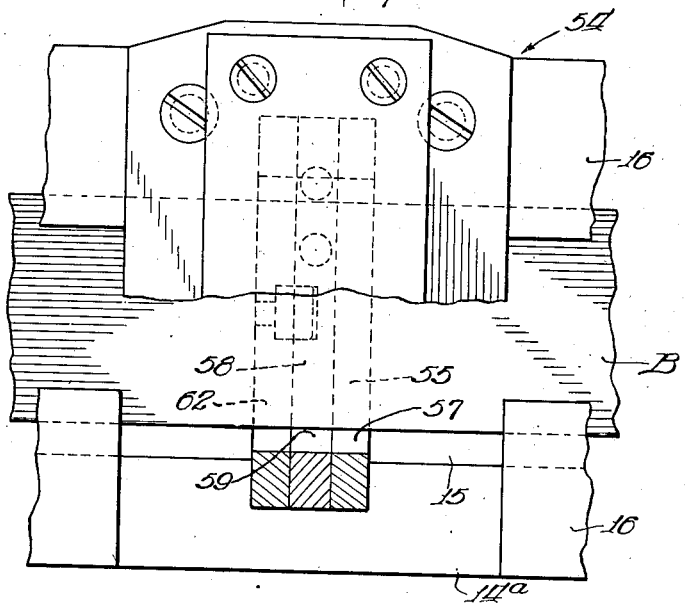

Fig. 6 is an elevational view of a portion of the structure illustrated in Figs. 1, 2, and 5, and taken substantially as indicated by the lines 6—6 of Figs. 2 and 4;

Fig. 7 is an enlarged sectional elevational view of the cut-off mechanism taken substantially as indicated by the lines 7—7 of Figs. 1 and 8;

Fig. 8 is a sectional elevational view of the cutting mechanism taken substantially as indicated by the line 8—8 of Fig. 7;

Fig. 9 is a plan view having a portion thereof broken away and illustrating portions of the structure shown in Figs. 7 and 8;

Fig. 10 is an enlarged sectional elevational view of the stop mechanism taken substantially as indicated by the line 10—10 of Fig. 1;

Fig. 11 is a sectional elevational view taken substantially as indicated by the line 11—11 of Fig. 10; and Fig. 12 is a sectional elevational view similar to that illustrated in Fig. 11, and illustrating certain portions of the stop mechanism in changed position.

The illustrative embodiment of the present invention is shown as applied to a machine for cutting off portions or sections of desired length from a strip of tube stock indicated at B, and shown as of a long relatively narrow strip of material suitable for forming tubes for radiator cores, or the like, and delivering the cut-off sections or portions to a tube forming machine indicated at 13 (Fig. 2), but forming no part of the present invention.

As illustrated in the drawings, the present invention comprises a frame 14 having a bed plate or table portion indicated, as a whole, by the numeral 14a extending along a side portion thereof and provided with a pair of laterally spaced substantially parallel guide bars 15 and laterally spaced inwardly overhanging plates 16 mounted thereon and forming a channel 17 for directing the tube stock or strip B longitudinally of the bed plate or table portion 14a.

Mounted on the frame 14, preferably, adjacent one end thereof is a variable speed device of suitable form indicated, as a whole, by the numeral 18 (Fig. 2), and shown, in the present instance, as provided with a constant speed shaft 19 adjacent one of its ends, and with a variable speed shaft 21 adjacent its opposite end, the mechanism for varying the relative speeds of the shafts 19 and 21 being of suitable construction, as, for example, the mechanism disclosed in Patent No. 1,774,176, issued to Richard Erban.

August 26, 1930, or of other suitable construction of variable speed gearing.

Mounted on the frame 14 adjacent the receiving end of the machine is a pair of slack-feed rolls 22 and 23 (Figs. 1 and 4), the lower roll 22 being mounted adjacent one end of a shaft 24 having a worm wheel 25 secured to its opposite end and operatively related to a worm 26 mounted on a countershaft 27, the shaft 27 being provided with a sprocket 28 having a driving connection through a chain 29 with a sprocket 31 secured to the constant speed shaft 19 of the variable speed device 18 for rotating the feed roll 22 in a direction to draw the strip of material or tube stock B from a roll 32 of the material rotatably mounted in a bracket 33 mounted on the frame of the machine, as illustrated in Fig. 1. The strip B is yieldingly engaged between the slack-feed rolls 22 and 23 by means of springs 34 (Fig. 6) surrounding a pair of bolts 35 operatively related to bearing blocks 36 and 37 adjacent the ends of the shaft 24 and a shaft 38 of the slack rolls 22 and 23, respectively, the slack rolls 22 and 23 serving to feed the strip B into the machine in a manner to form a slack portion or loop 39 of the material beyond the slack rolls 22 and 23 (Figs. 1 and 2).

Mounted in the frame 14 beyond the slack rolls 22 and 23 and beyond the loop or slack portion 39 of the strip B is pair of lower and upper feed rolls 41 and 42, respectively, of substantially uniform size and of slightly greater diameter than the slack rolls 22 and 23, the lower feed roll 41 being rotatably mounted on a sleeve 43 (Fig. 5) adjacent one end of a shaft 44, the opposite end of the shaft 44 having a worm wheel 45 secured thereto adapted to be engaged by a worm 46 secured to the shaft 27 on which the worm 26 is mounted, thereby providing a driving connection whereby the feed rolls 41 and 42 are driven, normally, at substantially the same speed as the slack rolls 22 and 23.

For frictionally driving the lower feed roll 41, the shaft 44 is provided with a sliding ring or collar 47 (Fig. 5) secured against rotation on the shaft by a key 48 and operatively related to one side of a friction disk 49, the opposite side or face of the disk engaging an inner portion of the lower feed roll 41, thereby providing a frictional connection between the shaft 44 and lower feed roll. The pressure exerted against the disk 49 is provided by a spring 50, and may be varied by adjusting a collar 50a longitudinally of the shaft 44.

For driving the upper feed roll 42, the roll 41 is provided with a pinion 51 adapted to mesh with a pinion 52 formed on the feed roll 42, as clearly illustrated in Fig. 5, the upper feed roll 42 being mounted on a stub shaft 53 rotatably mounted in the frame 14, the mounting of the feed roll 42 being shown in Fig. 5 as substantially like the mounting for the roll 41 although, if desired, a more simple mounting may be employed. The forward or front end portions of the feed roll shafts 44 and 53 are shown as mounted in blocks 36a and 37a, respectively, and the blocks yieldingly urged toward each other by springs 34a operating in conjunction with the block 37a and bolt head 35a in much the same manner as described with reference to the forward or front end mountings of the shafts 24 and 38 of the slack rolls 22 and 23, respectively, and as illustrated in Fig. 6.

Mounted on the frame 14 beyond the feed rolls 41 and 42, and suitably spaced therefrom is a cutting device indicated, as a whole, by the numeral 54 and, as clearly illustrated in Figs. 7, 8, and 9, comprises a stationary or relatively fixed plate or cutting member indicated, as a whole, by the numeral 55 having a cutting edge 56 formed thereon along the upper side of an elongated slot or aperture 57 formed in the plate 55, through which the strip B is intended to be threaded, and having a movable cutting member indicated, as a whole, by the numeral 58 operatively related thereto, the cutting member 58 being provided also with an elongated slot 59 adapted to receive the strip B, as clearly illustrated in Figs. 7 and 8. The portion of the member 58 adjacent the lower side of the slot 59 is provided with a cutting edge 60 adapted to cooperate with the cutting edge 56 of the relatively stationary member 55 when the movable cutting member 58 is raised against the action of a plurality of springs 61 by which the movable cutting members 58 is normally urged toward its lowermost position, the upper portion of the movable cutting member 58 above the slot 59 acting in its downward movement as a stripper for the severed portion of the tube stock to permit its continued movement toward the tube forming machine 13.

It will be noted by reference to Fig. 8 that the member 55 and a backing plate 62 of the cutting device are provided with inclined portions 63 and 64, respectively, for directing the unsevered end portion of the strip into the slots or apertures 57 and 59 formed in the stationary and movable cutting members 55 and 58, respectively, and toward the delivery end of the machine after a portion of the strip has been severed from the body portion thereof.

For actuating the movable cutter 58, a rotatable cam member indicated, as a whole by the numeral 65 is provided with an elongated radially disposed cam plate 66 having an inclined cam surface 67 adapted to engage an inclined cam surface 68 formed along the lower edge portion of the movable cutting member 58 for moving the cutter member upwardly in a manner to sever a leading portion of the strip B of tube stock by cooperation of the cutting edges 60 and 56 of the movable and stationary cutters 58 and 55, respectively.

For rotating the cam member 65 in a manner to bring the surface 67 of the cam plate 66 into cooperative relationship with the inclined surface 68 of the movable cutting member 58, the cam member 65 is secured adjacent one end of a shaft 69 (Figs. 3 and 7), the opposite end of the said shaft being provided with a worm wheel 71 (Figs. 2 and 3) adapted to be engaged by a worm 72 mounted adjacent one end of a shaft 73, the opposite end of the shaft 73 being provided with a sprocket 74 having a drive chain 75 trained therearound and operatively related to a sprocket 76 mounted on the outer end of the shaft 21 of the variable speed device 18, as clearly illustrated in Fig. 2, thereby providing a driving connection for the cam member 65 with the variable speed device 18 whereby, through the said variable speed device, the rotation of the cam member 65 and operation of the movable cutter 58 may be varied with respect to the rotation of the slack rolls 22 and 23, and the feed rolls 41 and 42.

Positioned beyond the cutting device 54, in suitable spaced relation thereto, is a stop member indicated as a whole by the numeral 77 mounted on and adjustably movable longitudinally of a rock shaft 78 extending substantially parallel to the channel 17 and rotatably mounted in bearings 79, 80 and 81 secured to the table portion 14a of the machine frame 14.

As clearly illustrated in Figs. 10, 11, and 12, the stop member 77 comprises an inwardly extending arm 82 secured adjacent one of its ends to the shaft 78 and having a transversely extending portion or stop piece 83 adapted to extend into a recess 84 formed in the bottom of the channel 17, as clearly illustrated in Fig. 12, in a manner to engage the leading end of the strip B for retaining the leading portion of the strip in position to be severed from the body portion thereof by the movable portion 58 of the cutting device. The laterally extending portion or stop piece 83 is provided with a vertically movable stripper plate 85 mounted thereon and secured against relative displacement with respect thereto by guide pins 86 and a pin or bolt 87 positioned in an elongated recess 88 formed in the laterally extending portion 83, the stripper plate 85 being urged normally in a downwardly direction by springs 89 when the stop is moved to raised position by a push rod 90 shown in Fig. 11 as actuated by a spring 91, the stop member when in raised position permitting the passage of the severed portion of the strip along the channel 17 toward the tube forming machine 13.

For actuating the stop member 77 substantially in synchronism with the operation of the cutting device 54, the cam member 65 is provided adjacent one of its ends with a cam plate 92 adapted to engage a roller 93 mounted adjacent one end of an arm 94 secured to the rock shaft 78, whereby the rock shaft may be rotated to position the laterally extending portion or stop piece 83 of the stop member 77 in the channel 17 and in the path of the strip B slightly in advance of the operation of the movable cutter 58 for severing a portion of the strip from the body portion thereof.

For advancing and moving the severed portion of the strip away from the cutting device 54 and stop member 77, a plurality of delivery rollers 95, 96, 97, and 98, engaging the under side of the strip, are secured to one end portion of the shafts 99, 101, 102, and 103, respectively, and above the strip are a plurality of presser rollers 104, 105, and 106 rotatably mounted respectively on pivotally mounted arms 107, 108, and 109, the arm 108 being manually movable to position the presser roller 105 mounted thereon in cooperative relationship with either of the delivery rollers 96 or 97, as desired, and as indicated, respectively, by the dotted line and full-line positions shown in Fig. 1.

As previously stated, the stop member 77 is adjustably mounted longitudinally of the rock shaft 78 for the purpose of gauging the desired length of material to be cut from the body portion of the strip B for forming tubes of various length, and by arranging the presser roller 105 to cooperate with either the delivery roller 96 or 97, a wide range of adjustment of the stop member 77 may be obtained.

For driving the delivery rolls 95, 96, 97, and 98 to rapidly move the severed portion of the strip B away from the leading end of the uncut or body portion thereof, the shaft 44 is provided with a sprocket 111 (Fig. 5), over which a chain 112 is trained and operatively related to a sprocket 113 mounted on the shaft 99 and of relatively smaller diameter than the sprocket 111, the shafts 101, 102, and 103 being connected with the shaft 99 by means of chain and sprocket connections 114, 115, and 116 for driving the respective shafts of the delivery rolls at substantially uniform speed. It will be noted, however, that the relatively different sizes of the sprockets 111 and 113 connected by means of the chain 112 will cause the delivery rolls to rotate at a substantially higher speed than the feed rolls 41 and 42, thereby moving the severed portion of the strip B away from the leading end of the uncut body portion thereof in a manner to provide a gap between the severed portion and the body portion of the strip, into which the stop piece 83 may be inserted for gauging the next succeeding length to be severed from the body portion of the strip.

For rotating the presser rolls 104, 105, and 106 in unison with the respective feed rolls 95, 96, 97, and 98, the latter are provided with pinions as indicated at 117 in Fig. 2 adapted to cooperate with pinions 118, 119, and 121 operatively related to the respective presser rolls.

In operation, the strip B is fed to the machine by the slack rolls 22 and 23 in a manner to form the loop or slack portion 39, from which the strip B is fed further into the machine by the frictionally driven feed rolls 41 and 42 until the leading end portion of the strip engages the stop piece 83 positioned in the channel 17, at which time the movement of the leading portion of the strip will be arrested by the stop member 77 and severed by the cutting device 54, after which the severed portion of the strip will be moved rapidly away from the then leading end of the body portion of the strip by the delivery rolls 95, 96, 97, and 98, the stoppage or arresting of the movement of the leading portion of the strip being compensated for by the slippage permitted to take place in the frictional driving connections of the feed rolls 41 and 42 with the shaft 44 notwithstanding the constant rotation thereof and of the shafts 24 and 38 of the slack rolls 22 and 23, respectively.

The constant rotation and feeding of the slack rolls 22 and 23 during the stoppage or arresting of the movement of the strip B during the cutting operation will add material to the loop 39, but by reason of the slightly increased diameter of the feed rolls 41 and 42 over that of the slack rolls 22 and 23, such additional material will be taken up when the rotation of the feed rolls is again resumed, thereby providing a structure wherein the amount of material in the loop or slack portion 39 is maintained substantially constant.

If, for any reason during the operation of the machine, it should be found desirable to render either the slack rolls 22 and 23 or the feed rolls 41 and 42 inoperative, the bearing portions in which the ends of the shafts 24 and 38 and the shafts 44 and 53 are rotatably mounted may be slightly separated by levers 122 and 123 adjacent the slack rolls 22—23 and feed rolls 41—42, respectively, the bearing portions of the shafts 38 and 53 being so constructed, as by reaming, to permit of slight separation of the respective slack rolls and feed rolls for rendering the rolls inoperative.

It will be apparent from the foregoing description that the present invention provides a cut-off machine of novel construction and arrangement wherein a strip of tube stock material may be fed continuously to the machine to provide a loop of slack material, from which the strip may be fed and cut intermittently to provide portions of desired length, and wherein the amount of material in the slack portion of the strip is maintained substantially constant.

Also, that the present invention provides a stop member and cutting device of novel construction, and means whereby the machine may be conveniently adjusted for severing or cutting the strip into portions of various length.

Obviously, the present invention is not limited to the precise construction and arrangement shown and described as the same may be variously modified. Moreover, all the features of the invention need not be used conjointly as the same may be used to advantage in variously different combinations and subcombinations.

What I claim as new and desire to secure by Letters Patent is:

1. In a material feeding and cut-off machine, the combination of a pair of frictionally driven rolls for feeding a strip of material to the machine, an intermittently operated stop member adapted to be engaged by the leading end of said strip, an intermittently operated cutter spaced from said stop member and operatively related to said strip, a cam member for operating the cutter, and means carried by said cam member for operating said stop member substantially in synchronism with said cutter.

2. In a material feeding and cut-off machine, the combination of a pair of frictionally driven rolls for feeding a strip of material to the machine, an intermittently operated stop member adapted to be engaged by the leading end of said strip, an intermittently operated cutter spaced from said stop member and operatively related to said strip for severing a portion thereof from the body portion of said material, a cam member for operating the cutter, means carried by said cam member for operating said stop member substantially in synchronism with said cutter, and means for moving the severed portion of the strip away from the body portion of said material.

3. In a machine of the class described, the combination of a pair of continuously operating feed rolls and a pair of frictionally driven feed rolls operatively related to said continuously operating rolls for feeding a strip of material to the machine, a stop member normally out of the path of said strip and adapted to be positioned intermittently in the path of movement of said strip to be engaged by the leading end thereof, an intermittently operated cutter spaced from said stop member for severing a leading portion of said strip from the body portion thereof, and actuating means for positioning the stop member in the path of movement of the strip to be engaged by the leading end thereof and for actuating the cutter to sever said leading portion of the strip while the leading end thereof is in engagement with said stop member.

4. In a machine of the class described, the combination of a pair of continuously operating feed rolls and a pair of frictionally driven feed rolls operatively related to said continuously operating rolls for feeding a strip of material to the machine, an adjustably mounted stop member adapted to be positioned intermittently in the path of movement of said strip to be engaged by the leading end thereof, an intermittently operated cutter positioned between said stop member and frictionally driven feed rolls for severing a leading portion of said strip from the body portion thereof, actuating means for positioning the stop member in the path of movement of the material to be engaged by the leading end thereof and for actuating the cutter to sever said leading portion of the strip while the leading end thereof is in engagement with said stop member, and means for moving the severed portion of the strip longitudinally and away from the body portion of said material.

5. In a machine of the class described, the combination of a pair of continuously operating feed rolls and a pair of frictionally driven feed rolls operatively related to said continuously operating rolls for feeding a strip of material to the machine, an adjustably mounted stop member adapted to be positioned intermittently in the path of movement of said strip to be engaged by the leading end thereof, an intermittently operated cutter positioned between said stop member and frictionally driven feed rolls for severing a leading portion of said strip from the body portion thereof, actuating means for positioning said stop member in the path of movement of the strip to be engaged by the leading end thereof and for actuating the cutter to sever said leading portion of the strip while the leading end thereof is in engagement with said stop member, means for moving the severed portion of the strip longitudinally and away from the body portion of the material, and variable speed mechanism operatively related to said feed rolls and to said stop member and cutter actuating means for varying the speed of said rolls in relation to the operation of said stop member and cutter.

6. In a machine of the class described, the combination of a pair of cooperating continuously rotating feed rolls and a pair of cooperating frictionally driven feed rolls operatively related to said continuously rotating rolls for feeding a strip of material to the machine, an adjustably mounted stop member adapted to be positioned intermittently in the path of movement of said strip to be engaged by the leading end thereof, an intermittently operated cutter positioned between said stop member and frictionally driven feed rolls for severing the leading portion of said strip from the body portion thereof, actuating means operatively related to said stop member and cutter for positioning the stop member in the path of movement of the strip to be engaged by the leading end thereof and for actuating the cutter to sever said leading portion of the strip while the leading end thereof is in engagement with said stop member, a plurality of delivery rolls for moving the severed portion of the strip longitudinally and away from the body portion of said material, and variable speed mechanism operatively related to said feed and delivery rolls and to said stop member and cutter actuating means for varying the speed of said feed and delivery rolls in relation to the operation of said stop member and cutter.

7. In a machine of the class described, the combination of a pair of cooperating continuously rotating feed rolls and a pair of cooperating frictionally driven feed rolls of slightly greater diameter than the diameter of said continuously rotating rolls and operatively related thereto for feeding a strip of material to the machine, a stop member adapted to be positioned intermittently in the path of movement of said strip to be engaged by the leading end thereof, an intermittently operated cutter positioned between said stop member and frictionally driven feed rolls for severing the leading portion of said strip from the body portion thereof, said cutter and stop member being relatively movable toward and away from each other, actuating means operatively related to said stop member and cutter for positioning the stop member in the path of movement of the strip to be engaged by the leading end thereof and for actuating the cutter to sever said leading portion of the strip while the leading end thereof is in engagement with said stop member, a plurality of continuously rotating delivery rolls for moving the severed portion of the strip longitudinally and away from the body portion of said material, and variable speed mechanism operatively related to said feed and delivery rolls and to said stop member and cutter actuating means for varying the speed of said feed and delivery rolls in relation to the operation of said stop member and cutter.

8. In a machine of the class described, the combination of a pair of positively driven feed rolls and a pair of frictionally driven feed rolls of slightly greater diameter than the diameter of said positively driven rolls, said rolls being operative to feed a strip of material to the machine, a stop member adapted to be positioned intermittently in the path of movement of said strip, an intermittently operated cutter positioned between said stop member and frictionally driven feed rolls for severing a portion of said strip, said cutter and stop member being relatively movable toward and away from each other to vary the length of the portion cut from said strip, actuating means operatively related to said stop member and cutter for positioning the stop member in the path of movement of the strip and for actuating the cutter to sever said portion thereof, a plurality of positively driven delivery rolls for moving the severed portion of the strip away from the body portion of said material, and variable speed mechanism operatively related to said feed and delivery rolls and to said stop member and cutter actuating means for varying the speed of said feed and delivery rolls in relation to the operation of said stop member and cutter.

9. In a machine of the class described, the combination of a frame, elongated substantially parallel guides thereon for guiding an elongated relatively narrow strip of material through the machine, a pair of frictionally driven rolls for feeding said material to said guides, a rock shaft mounted on said frame at one side of said guides, a stop member mounted on said shaft and adapted to be positioned in the path of movement of said strip, a cutter positioned between said stop member and feed rolls and operatively related to said strip for severing a portion thereof, a cam member below the path of movement of said strip and operatively related to said cutter and to an arm on said rock shaft for actuating said stop member, and delivery rolls for moving the severed portion of the strip away from the body portion thereof.

10. In a machine of the class described, the combination of a frame, elongated substantially parallel guides thereon providing a channel for receiving and guiding an elongated relatively narrow strip of material through the machine, a pair of frictionally driven rolls for feeding said material to and through said channel, a rock shaft mounted on said frame at one side of said channel, a stop member adjustably mounted on said shaft and adapted to be positioned intermittently in said channel and in the path of movement of said strip, a reciprocating cutter blade having an elongated aperture formed therein adapted to receive said strip and positioned between said stop member and feed rolls, a rotating cam member having a cam plate on its peripheral side for reciprocating said blade to sever a portion of said strip and having a second cam plate on one end of said cam member operatively related to an arm on said rock shaft for actuating said stop member, a plurality of positively driven delivery rolls for moving the severed portion of the strip away from the body portion thereof, and variable speed mechanism operatively related to said feed and delivery rolls and to said cam member for varying the speed of said rolls in relation to the operation of said cutter blade and stop member.

11. In a machine of the class described, the combination of a frame, elongated substantially parallel guides thereon for guiding an elongated strip of material through the machine, a pair of positively driven feed rolls and a pair of frictionally driven feed rolls of slightly greater diameter than the diameter of said positively driven rolls, said rolls being operative to feed said strip of material to said guides, a rock shaft mounted on said frame at one side of said guides, a stop member mounted on said shaft and adapted to be positioned between said guides and in the path of movement of said strip, a cutter having a movable portion provided with an elongated opening therein adapted to receive said strip of material and positioned between said stop member and feed rolls for severing a portion of said strip, a cam member below said guides operatively related to said movable cutter portion and to an arm on said rock shaft for actuating said stop member to move the stop member into the path of movement of said material, delivery rolls for moving the severed portion of the strip away from the body portion thereof, and means operatively related to said positively driven feed rolls for manually separating said rolls.

MARTIN G. BOERGER.